United States Patent [19]
Adams

[11] 3,899,890
[45] Aug. 19, 1975

[54] SERVO ASSEMBLIES AND SYSTEMS

[75] Inventor: Frederick John Adams, Campton, England

[73] Assignee: Cam Gears Limited, Hitchin, England

[22] Filed: Nov. 26, 1973

[21] Appl. No.: 419,110

[30] Foreign Application Priority Data
Dec. 15, 1972 United Kingdom............ 58125/72

[52] U.S. Cl. .................. 60/552; 91/378; 91/434
[51] Int. Cl. ............................................ F15b 7/00
[58] Field of Search ........ 91/370, 378, 434; 60/547, 60/552

[56] References Cited
UNITED STATES PATENTS

| | | | |
|---|---|---|---|
| 2,916,882 | 12/1959 | Spalding et al. .................. | 91/378 |
| 3,283,505 | 11/1966 | Jalow et al. ...................... | 60/552 |
| 3,677,006 | 7/1972 | Erdmann ......................... | 60/552 |

FOREIGN PATENTS OR APPLICATIONS

| | | | |
|---|---|---|---|
| 2,012,472 | 10/1971 | Germany ......................... | 91/378 |
| 1,917,954 | 10/1970 | Germany ......................... | 91/378 |

Primary Examiner—Martin P. Schwadron
Assistant Examiner—H. Burks, Sr.

[57] ABSTRACT

A servo assembly in which motive force is transmitted directly from an input to an output of the assembly, the assembly being coupled to a source of fluid under pressure so that power assistance is provided to the motive force transmitted to the output while a reaction is applied to the input, the reaction being indicative of the power assistance afforded to the output.

25 Claims, 10 Drawing Figures

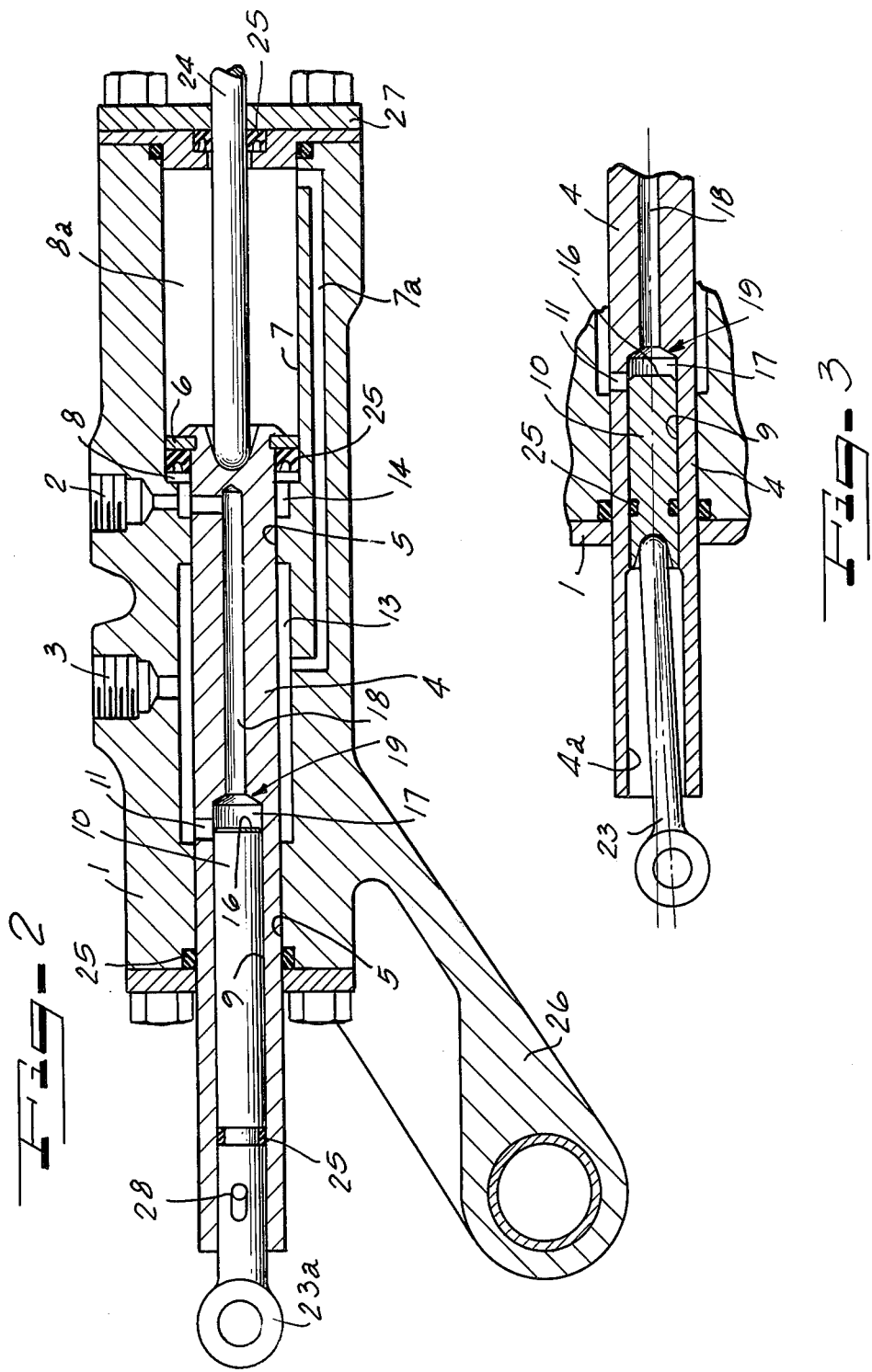

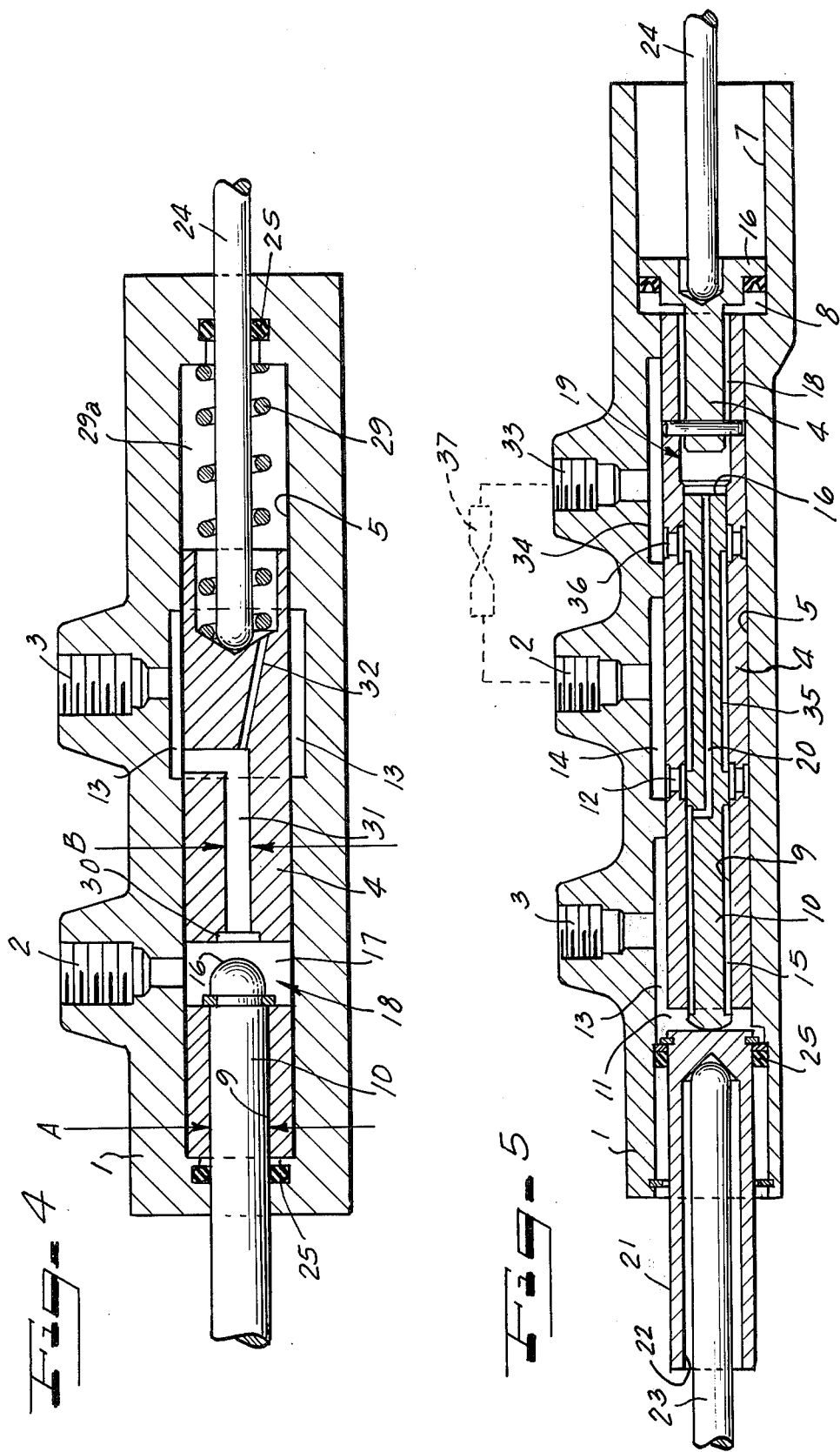

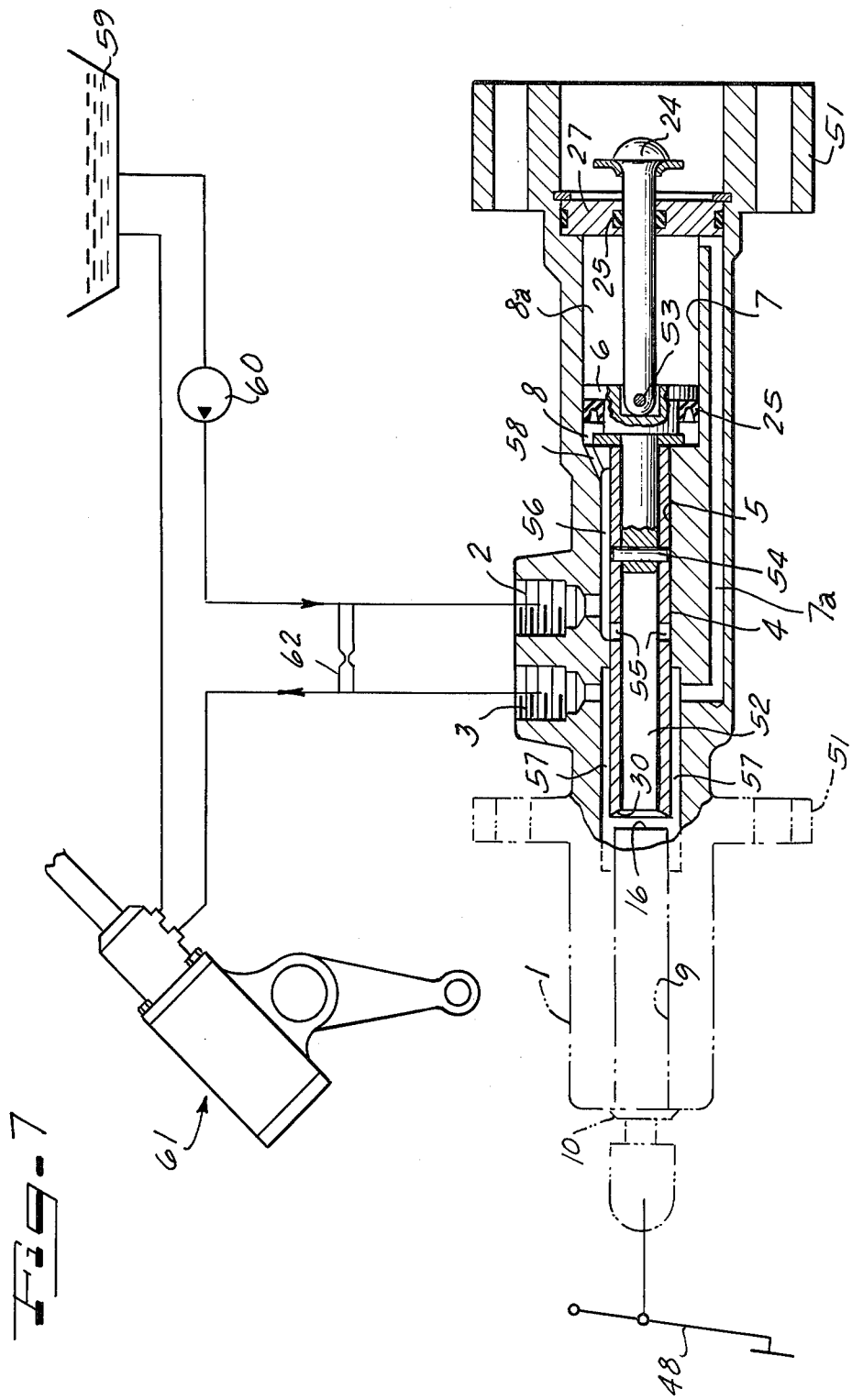

SERVO ASSEMBLIES AND SYSTEMS

BACKGROUND OF THE INVENTION

FIELD OF THE INVENTION

This invention is in the field of servo assemblies, particularly of the type used for effecting operation of a clutch or brake assembly of a motor vehicle.

SUMMARY OF THE INVENTION

According to the present invention there is provided a servo assembly for transmitting motive force from an input to an output thereof and which comprises a valve housing having a fluid pressure inlet port and a fluid outlet port; a working spool in the housing and axially slidable in a working cylinder; a control spool in the housing and axially slidable in a control cylinder; a reaction chamber formed between the control spool and the working spool; the working spool having an effective pressure area in the reaction chamber which is greater than the effective pressure area of the control spool in the reaction chamber; axial movement of the control spool being responsive to the input and the output being responsive to axial movement of the working spool; means communicating the reaction chamber to the outlet part in a neutral condition of the assembly and in the absence of axial pressure on the control spool, and wherein the control spool is arranged in response to axial pressure thereon to close off communication of the reaction chamber with the outlet port and to communicate the reaction chamber to the inlet port whereby fluid pressure in the reaction chamber provides power assistance for applying pressure to the working spool in one axial direction, and provides a reactive force on the control spool in the opposite axial direction.

More particularly the present invention provides a servo assembly for transmitting motive force from an input to an output thereof and which comprises a valve housing having a fluid pressure inlet port and a fluid outlet port; a working spool in the housing and axially slidable in a working cylinder; a control spool in the housing and axially slidable in a control cylinder; the control and working cylinders being substantially in axial alignment and there being a reaction chamber located axially between, and at least partly defined by, the control spool and the working spool; the working spool and control spools having different effective pressure areas in the reaction chamber which effective areas are such that, when the reaction chamber is pressurized, the applied axial pressure on the control spool is less than the applied axial pressure on the working spool; the output being responsive to axial displacement of the working spool in its cylinder and the input being capable of displacing the control spool in its cylinder in one sense of axial direction to contract the reaction chamber; and wherein the assembly is arranged so that, in a neutral condition of the assembly, the reaction chamber communicates with the outlet port and axial displacement of the control spool in said one sense by the input causes the working spool to be displaced in the said one sense and during said axial displacement of at least one of the spools, the reaction chamber is closed to communication with the outlet chamber and communicates with the inlet port whereby, when the inlet port is connected to a source of fluid under pressure, fluid pressure in the reaction chamber provides power assistance for displacing the working spool in the said one sense of axial direction and imparts to the control spool a reaction in the opposite sense, which reaction provides a resistance to movement of the control spool in said one sense and is proportional to the motive force transmitted to the output.

Further according to the present invention there is provided a fluid pressure operated power booster system comprising a servo assembly as specified in either of the two immediately preceding paragraphs and in which the output communicates with a device which is intended to be operated by the output in response to a displacement of the working spool in said one sense of axial direction and the input is coupled to manual controlled means which is adjustable to effect displacement of the control spool.

By the term "fluid" as used throughout this specification is meant a gas or a liquid so that the servo assembly may form part of, for example, a pneumatically or a hydraulically operated power booster system. Further, the term "manual" is intended to include means which are controllable by an operator other than by hand as, for example, a foot pedal.

The servo assembly of the present invention was particularly developed having in mind its application to fluid systems for effecting operation of a clutch or brake of a vehicle. In its application to a braking system the servo assembly may have its input coupled to the brake foot pedal and the output communicating with the brake master cylinder so that when the pedal is moved to apply the brake, power assistance is imparted to the working spool and the output is transmitted to the brake master cylinder while the reaction against the control spool (which is felt through the input on the foot pedal) provides a resistance which is indicative of the braking force applied. In its application to a clutch system the output of the servo assembly communicates with the clutch master cylinder while the input is coupled to the clutch foot pedal so that when the clutch pedal is moved to disengage the clutch, the resultant movement of the working spool is transmitted through the output to actuate the clutch master cylinder in a conventional manner. A particular advantage which may be achieved by incorporating the servo assembly in a clutch system is that the power assistance imparted to the working spool can cause the latter to move axially to a greater extent than the axial movement of the control spool which is effected manually through the input; such an arrangement can provide a desirable resistance to movement of the clutch pedal while considerably reducing the clutch pedal travel in comparison with conventional arrangements which have hitherto provided a desirable light resistance to movement of the foot pedal at the expense of having a large amount of pedal movement. If required, the servo assembly of the present invention can be provided as an extension of, or integral with the clutch/brake master cylinder or alternatively the servo assembly may be fitted into existing vehicle clutch/brake systems between the driver's foot controls and the existing clutch/brake master cylinders.

An important feature which may be derived from the servo assembly is that of a fail-safe characteristic in that should the fluid pressure fail when it is incorporated in a clutch or braking system, the axial movement which is imparted in said one sense to the control spool by the input will cause sympathetic axial movement of the working spool and, although the latter is not power assisted, a direct transmission through the servo assembly to the output is provided which can be used to operate the clutch or brake in a conventional manner.

The servo assembly may incorporate valvery to be of the closed center type whereby, in the neutral condition of the assembly, the reaction chamber is closed to communication with the inlet port and is open to communication with the outlet port but on axial displacement of the control spool in said one sense, the reaction chamber is closed to communication with the outlet port and progressively opened to communication with the inlet port. The closed center type of assembly is especially suitable for use in a system in which the fluid pressure source is from an hydraulic accumulator or similar device. Alternatively the servo assembly may incorporate valvery to be of the open center type, whereby with the assembly in its neutral condition, the reaction chamber is open to communication with both the inlet and outlet ports so that fluid under pressure passes through the assembly by way of the reaction chamber but on axial displacement of the control spool in said one sense, the reaction chamber is progressively closed to communication with the outlet port while its communication with the inlet port is maintained. The open center type of assembly is particularly suitable for use in a system in which the fluid pressure source is from a continuously driven pump or similar device.

The working spool preferably comprises a piston part which is preferably integral with the working spool but is at least arranged to move in unison with the working spool in at least said one sense of axial direction. The piston part is axially displaceable in a piston cylinder and forms with the piston cylinder a piston working chamber. This piston working chamber is arranged to be in communication with, and forms part of, the reaction chamber so that, when the reaction chamber is pressurized, the pressure differential which is obtained by fluid pressure on the effective areas of the working spool and the control spool in the reaction chamber may be considerable due to the relatively large effective pressure area which can be provided on the piston part.

The output conveniently comprises a rod which extends from the assembly and is axially displaceable in said one sense by movement of the working spool. Alternatively the output may comprise fluid which is displaced from the assembly during axial displacement in said one sense of the working spool. In the aforementioned construction in which the working spool comprises a piston part, the fluid displacement output from the assembly is conveniently taken from the piston cylinder on the side of the piston part remote from the aforesaid piston working chamber.

Biasing means will generally be provided by which the working spool is biased in the opposite sense of axial direction to the neutral condition of the servo assembly. This biasing means conveniently comprises spring means housed within the servo assembly. Alternatively (or in addition) appropriate biasing means can be provided on the output and which means is external of the servo assembly, for example, as may be afforded by spring means or fluid pressure applied to the output. When the servo assembly forms part of a power-booster system for a device such as a clutch or brake master cylinder, the biasing of the working spool in the opposite sense of axial direction which is transmitted through the output may be provided by appropriate spring or other biasing means which may be conventionally incorporated in such device to bias that device into its inoperative or neutral condition.

The working cylinder, control cylinder (and piston cylinder when provided) are preferably co-axial and of these the control cylinder may be defined, in part, by a bore in the working spool so that the control spool is partly or wholly received within the working spool. Alternatively with the control and working cylinders co-axial, the working spool and control spool may be located in tandem. In both of these constructions the reaction chamber is partly defined by an end of the control spool.

If the servo assembly is fitted in a brake/clutch system of a vehicle as above mentioned and such vehicle has power assisted steering, then the fluid pressure source for the power steering is conveniently used to provide the power assistance through the servo assembly for the brake or clutch operation.

BRIEF DESCRIPTION OF THE DRAWINGS

Several embodiments of the present invention will now be described, by way of example only, with reference to the accompanying illustrative drawings in which:

FIG. 2 illustrates, in axial section, a second embodiment of servo assembly constructed in accordance with the present invention, the assembly being of the open center type and particularly suitable for use as a power booster in a vehicle clutch or braking system;

FIG. 3 illustrates, in axial section, a modification to part of the assembly shown in FIG. 2;

FIG. 4 illustrates, in axial section, a third embodiment of servo assembly constructed in accordance with the present invention, the assembly being of the open center type and suitable for use as a power booster in a vehicle clutch or braking system;

FIG. 5 illustrates, in axial section, a fourth embodiment of servo assembly constructed in accordance with the present invention, the assembly being of the open center type and suitable for use as a power booster in a vehicle clutch or braking system, the assembly having provision for its inclusion in the fluid system of a fluid pressure operated power assisted steering gear which may be provided for the vehicle;

FIG. 7 illustrates, in axial section, a sixth embodiment of servo valve assembly constructed in accordance with the present invention, the assembly being of the open center type and suitable for use as a power booster in a vehicle clutch or braking system and in which the assembly is shown forming part of a fluid pressure operated power assisted steering gear system of a vehicle, and FIGS. 8 to 10 diagrammatically illustrate respective arrangements in which the servo assemblies may be incorporated as part of fluid pressure operated power booster systems.

DESCRIPTION OF THE PREFERRED EMBODIMENTS

Where possible throughout the following description the same parts or members in each of the Figures have been accorded the same references.

Figure 1:
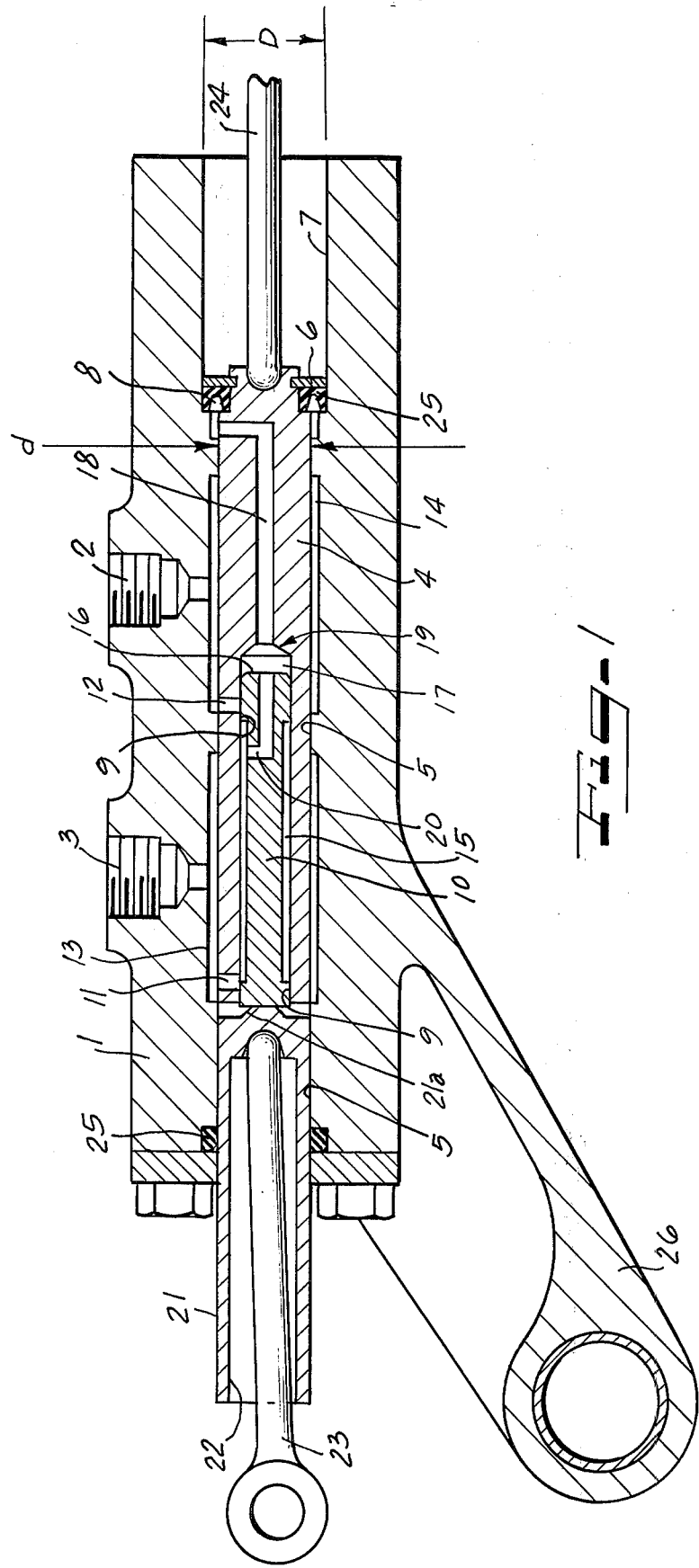
FIG. 1 illustrates, in axial section, one embodiment of a closed center type servo assembly constructed in accordance with the present invention, the servo assembly being particularly suitable for incorporation as a power booster in a vehicle braking system.

The servo assembly shown in FIG. 1 comprises a valve housing 1 having a fluid inlet port 2 and a fluid outlet port 3. A working spool 4 is axially slidable in a working cylinder 5 in the housing 1 and the working spool has a coaxial piston part 6 which is slidable in a piston cylinder 7. A piston working chamber 8 is formed between the piston part 6 and one end of the piston cylinder 7 while the other end of the cylinder 7 opens from the housing 1.

The working spool 4 has a coaxial counterbore which forms a control cylinder 9 in which a control spool 10 is axially slidable. Extending radially through the working spool 4 to communicate with the control cylinder 9 are two axially spaced ports 11 and 12. The port 11 is in constant communication with an annular recess 13 in the working cylinder which recess 13 is in constant communication with the outlet port 3. The port 12 is in constant communication with an annular recess 14 in the working cylinder 5 which recess 14 is in constant communication with the inlet port 2. The control spool 10 has a circumferential recess 15 the axial length of which is slightly less than the axial spacing between the ports 11 and 12 so that these two ports cannot simultaneously communicate with the annular recess 13. An end face 16 of the control spool 10 partly defines at the inner end of the control cylinder 9 a first chamber 17, this chamber 17 is in constant communication through a passage 18 in the working spool 4 with the piston working chamber 8. The first chamber 17, passage 18 and chamber 8 collectively constitute a reaction chamber shown generally at 19. The chamber 17 is in constant communication with the annular recess 15 by a passage 20 in the control spool 10.

A plunger 21 having a nose portion 21a is axially slidable in the working cylinder 5 so that the nose portion 21a abuts an end face of the control spool 10 which is axially remote from its end face 16. The plunger 21 has a blind bore 22 which freely receives a control rod 23 which latter abuts the inner end of the blind bore 22 and can exhibit restricted pivotal movement thereon within the plunger 21.

The end of the working spool 4 remote from the plunger 21 is coupled to a transmission rod 24 which extends from the housing 1 through the piston cylinder 7. Conventional pressure seals and/or ring seals shown generally at 25 are provided as appropriate.

The servo assembly shown in FIG. 1 is particularly suited for use in a power booster braking system of a vehicle and for this purpose the housing 1 has a bracket 26 by which the assembly can be fitted to a vehicle frame with the control rod 23 connected through an appropriate linkage to the brake foot pedal, the transmission rod 24 coupled to operate a conventional type of brake master cylinder, the input port 2 connected to a source of hydraulic fluid pressure (such as an hydraulic accumulator) and the outlet port 3 to low pressure exhaust such as a reservoir. The valve assembly is drawn in its neutral condition and is of the close center type since, in such condition, fluid under pressure is confined to the annular recess 14 by the port 12 being closed by the control spool while the reaction chamber 19 communicates with exhaust at port 3 by way of passage 20, recess 15, port 11 and recess 13.

When the brake pedal is operated the control rod 23 displaces the plunger 21 axially rightwardly in the drawing and by the abutment of the nose portion 21a on the control spool 10 moves the latter axially rightwardly relative to the working spool 4 causing the recess 15 to first close to port 11 and immediately thereafter to open to port 12. Fluid under pressure at port 12 now enters the reaction chamber 19 by way of passage 20 and recess 15. The working spool 4 now moves rightwardly under the assistance of such hydraulic pressure in the reaction chamber 19 while a reaction in the opposite sense of axial direction is applied to the end face 16 of the control spool. The effective area of the working spool 4 on which fluid pressure in the reaction chamber acts to move this spool rightwardly is constituted by the annulus formed between the diameter D of the piston and the diameter d of the working cylinder 5 and this area is considerably larger than the area of the end face 16 of the control spool 10. The reaction on the control spool of fluid pressure in the reaction chamber 19 is fed back to the brake pedal through rod 23 and provides a resistance to movement of the control spool 10 that indicates the power assistance which is being provided on the working spool and is therefore a direct indication to the operator of the amount of braking effort which is being applied.

When the brake pedal is released, fluid pressure in the reaction chamber 19 displaces the control spool 10 and plunger 21 leftwardly in the drawing so that recess 15 is first closed to port 12 and then opened to exhaust at port 11. The reaction chamber 19 is now open to exhaust at port 11 by way of the recess 15 and passage 20 and the conventional biasing in the brake master cylinder displaces the transmission rod 24 leftwardly in the drawing to return the working spool 4 to the neutral position as shown.

The embodiment shown in FIG. 2 is similar in several respects to the assembly shown in FIG. 1 but is of less complicated construction since the valvery is of the open center type. In FIG. 2 the annular recess 14 which is in constant communication with the inlet port 2 is also in constant communication with the piston working chamber 8. The port 12 has been omitted and the port 11 is controlled by axial movement of the control spool 10 to be opened or closed to communication with the chamber 17. The control spool 10 extends from its cylinder 9 and the housing 1 to provide an input end 23a.

The servo assembly shown in FIG. 2 is suitable for use as a power booster in a vehicle braking or clutch system whereby the input end 23a is linked for movement with the appropriate foot pedal and the transmission rod 24 is connected to operate the conventional brake or clutch master cylinder. As the valvery is of the open center type, the inlet port 2 can be connected to the outlet of a continuously driven pump while the outlet port 3 communicates with the pump reservoir. With the assembly in its neutral condition as drawn hydraulic fluid freely circulates through port 2, the reaction chamber 19 (chamber 8, passage 18, chamber 17) port 11, recess 13 and port 3 so that very little pressure is generated in the system. If the foot pedal is now operated to displace the control spool 10 rightwardly through its input end 23a and relative to the working spool, the chamber 17 (and thereby the reaction chamber 19) is closed to communication with the outlet port 11. Consequently fluid pressure in the reaction chamber 19 increases due to the supply through the inlet port 2 and assists in moving the working spool 4 and transmission rod 24 rightwardly to operate the device connected to the transmission rod for so long as the port 11 is closed by the control spool 10. During such power assistance the fluid pressure in reaction chamber 19 applied to the end face 16 of the control spool imparts a reaction through this spool to the foot pedal which reaction is indicative of the motive force transmitted to the rod 24 in a similar manner to the FIG. 1 embodiment.

When the foot pedal is disengaged the control spool 10 is displaced leftwardly as a result of, or assisted by, fluid pressure in the piston chamber 17 to open the reaction chamber 19 to exhaust at port 11 while biasing on the transmission rod 24 leftwardly in the drawing (which is achieved from the device to which the rod 24 is coupled) displaces the working and control spools leftwardly to return the servo assembly to its neutral condition as drawn.

The piston chamber 7 in FIG. 2 is shown closed by an end plate 27 of the housing while the rod 24 is slidable in sealed manner through the end plate. If required a vent passage 7a can be provided from the piston chamber 8a (which is thus formed on the side of the piston part 6 remote from the piston working chamber 8) to the low pressure outlet port 3 by way of the recess port 13.

Conveniently a lost motion device 28 in the form of a pin and slot mechanism is provided between the control spool 10 and working spool 4 to permit restricted axial movement of one relative to the other which movement is sufficient for the control spool to open and close port 11.

In FIG. 3 which shows a modification of the assembly in FIG. 2, the control spool 10 is displaced in its cylinder 9 by the control rod 23 which is housed in a counterbore 4a of the working spool 4. The control rod 23 abuts the adjacent end of the control spool and is capable of restricted pivotal movement thereon within the counterbore 4a.

The servo assembly shown in FIG. 4 is also of the open center type and in this embodiment the control and working spools 10 and 4 are in tandem with the control spool 10 extending from the housing 1 to an appropriate input end for connection to a foot pedal while the working spool 4 is biased axially leftwardly in its cylinder 5 by a mechanical spring 29 which is conveniently mounted on the transmission rod 24 in a spring chamber 29a formed at the end of the working cylinder 5. The end face 16 of the control spool is hemispherical and, during axial movement of the control spool rightwardly, is adapted to close a mouth 30 in the adjacent end face of the working spool 4. The mouth 30 communicates through a passage 31 in the working spool to be in constant communication with the annular recess 13 and thereby the outlet port 3. A vent passage 32 is provided in the working spool between the passage 31 and spring chamber 29a.

In the neutral condition of the servo assembly as drawn, hydraulic fluid (from an engine driven pump of a vehicle in which the assembly is fitted) freely circulates from the inlet port 2, chamber 17 (which effectively constitutes the reaction chamber 18) passage 31 and recess 13 to the outlet port 3. When the foot pedal is operated to displace the control spool 10 axially rightwardly, the face 16 closes mouth 30 and thereby shuts off the reaction chamber 18 to exhaust. Fluid pressure from the pump now builds up in the reaction chamber 18 to assist in moving the working spool 4 rightwardly against its spring biasing and causes the transmission rod 24 to operate an appropriate device to which it is coupled. As the mouth 30 is closed a reaction is applied to the area of the end face 16 which is exposed to the reaction chamber 18 and this reaction is transmitted through the control spool to the foot pedal to provide the operator with a reaction which is proportional to the motive force on the transmission rod 24. In the illustrated embodiment, when the mouth 30 is closed, the reaction on the control spool end face 16 is provided by hydraulic pressure acting on the exposed annulus between the diameter B of the mouth 30 and the diameter A of the control spool 10 while the power assistance on the working spool 14 is provided by fluid pressure acting on the considerably greater area of the annular end face of the control spool in the reaction chamber 18.

The embodiment of servo assembly shown in FIG. 5 is similar in many respects to the assembly shown in FIG. 1 in that its valvery is of the closed center type insofar as the transmission from the control rod 23 to the transmission rod 24 is concerned; however, the assembly in FIG. 5 has provision whereby it may be incorporated in the system of a fluid pressure operated power assisted steering gear and such provision comprises additional valvery of the open center type. With this latter feature in mind the housing has a secondary outlet port 33 which is in constant communication with an annular recess 34 in the working cylinder 5. The control spool 10 is axially slidable in its cylinder within the working spool 4 in a similar manner to the FIG. 1 embodiment and has a second circumferential recess 35 which is axially spaced from, and is located axially between its end face and its circumferential recess 15. A port 36 extends radially through the working spool to communicate between the control cylinder 9 and the annular recess 34 with which latter it is in constant communication. The ports 11, 12 and 36 in the working spool are so arranged with respect to the annular recess 15 and 35 in the control spool that in the neutral condition of the assembly as drawn, recess 15 communicates with port 11 but is closed to communication with port 12, and recess 35 is open to communication between port 12 and port 36. Consequently with the inlet 2 connected to fluid pressure ports 11 and 12 and control spool 10 constitute closed center valvery while ports 12 and 36 and the control spool 10 constitute open center valvery.

For convenience of manufacture, the working spool 4 is made in two parts, a main tubular body part in which is housed the control spool 10 and the piston part 6 which is secured, conveniently by a pin as shown, for movement in unison with the tubular body part.

In its application to a motor vehicle, the servo assembly shown in FIG. 5 is installed with the control rod 23 coupled to the brake or clutch pedal, the transmission rod 24 is coupled to operate the brake or clutch master cylinder, the inlet port 2 is connected to the output from a motor driven pump and the outlet port 3 is connected to a reservoir for the pump. In addition the second outlet port 33 is connected in series with, and prior to, a conventional fluid pressure operated power assisted steering gear of the vehicle. In use of such a system, with the servo assembly in its illustrated neutral condition, fluid from the pump passes by way of port 2, recess 14, port 12, recess 35, port 36, recess 34 and the second outlet port 33 to the power assisted steering gear while such fluid pressure is cut off from communication with the annular recess 15. Consequently any pressure fluctuations in the port 12 due to the use of power assisted steering have no effect on the transmission between the rods 23 and 24. The reaction chamber 19 (comprising a first chamber 17, passage 18 and piston working chamber 8) however communicates with the outlet port 3 by way of passage 20, recess 15, port 11 and recess 13.

When the foot pedal is operated to displace the control rod 23 and thereby plunger 21 rightwardly, the plunger abuts the adjacent end of control spool 10 which it displaces axially rightwardly relative to and within the working spool 4 to close recess 15 to communication with port 11 and also close recess 35 to communication with port 12 while opening recess 15 to fluid pressure at port 12. Preferably the recess 15 opens to port 12 immediately after it closes to port 11 and recess 35 closes to port 12 substantially simultaneously with that port being opened to recess 15. During such axial displacement of the control spool 10 rightwardly fluid flow from the inlet 2 to the power assisted steering gear is increasingly restricted while the reaction chamber 19 is being closed to communication with the outlet port 3 and subsequently being opened to communication with fluid pressure at the port 12 by way of recess 15 and passage 20. Fluid pressure in the reaction chamber 19, particularly in the piston working chamber 8 thereof, assists in axial movement of the working spool 4 rightwardly while imparting a reaction through the end face 16 of the control spool 10 reaction which is transmitted back to the foot pedal to provide the operator with an indication of the motive force which is being transmitted through the rod 24.

Preferably a restricted passage shown diagrammatically at 37 is provided between the inlet port 2 and the second outlet port 33 so that a quantity of fluid can pass by way of this passage from the pump to the power assisted steering gear even when the servo assembly is fully operated and the port 12 is closed to communication with the recess 35. It will be appreciated that the restricted passage 37 should be such as to allow a predetermined necessary minimum quantity of fluid to by-pass the servo assembly to the power steering circuit when under maximum pressure conditions.

When the foot pedal is released the control spool is moved axially leftwardly to the neutral condition by the fluid pressure in the reaction chamber 19 while the working spool 4 is displaced axially leftwardly by biasing of the transmission rod 24 which is applied thereto from the conventional brake or clutch master cylinder.

Figure 6:
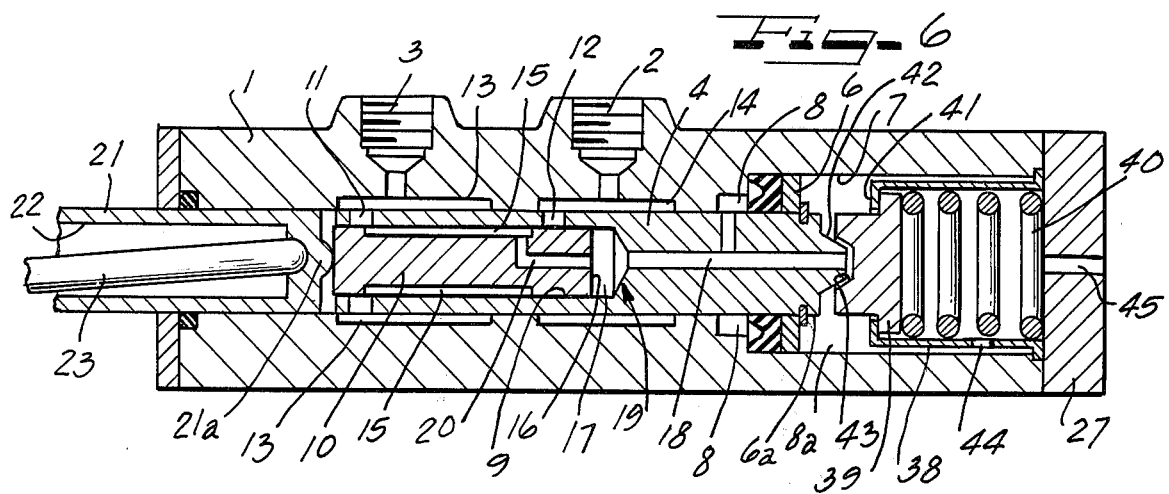
FIG. 6 illustrates in axial section, a fifth embodiment of servo assembly constructed in accordance with the present invention, the assembly being of the close center type and suitable for use as a power booster in a fluid pressure operated vehicle clutch system.

In each of the above described and illustrated embodiments, the output from the servo assembly is provided mechanically by way of a transmission rod, however, such a form of output is by no means essential and FIG. 6 illustrates an embodiment in which the motive power output from the servo assembly is achieved by displacement of fluid.

The servo assembly shown in FIG. 6 is similar to that shown in FIG. 1, however, the piston cylinder 7 is closed by an end plate 27 to provide the piston chamber 8a fixedly secured in which is a tubular spring housing 38. The diameter of the tubular housing 38 is slightly less than that of the piston cylinder 7 and a port 44 is provided in the wall of the housing 38 to communicate between the piston chamber 8a to the inside of the housing while a communication port 45 is provided in the end plate 27 to open into the enclosure of the spring housing 38.

Axially slidable in the spring housing 38 is a secondary piston 39 which is biased axially leftwardly by a spring 40 and towards an inwardly extending flange 41 on the spring housing 38. The end of the working spool 4 adjacent to the piston cylinder has a frusto conical projection 42 which is coaxial with its spool and the secondary piston 39 has, on the side thereof adjacent to the working spool, a frusto conical recess 43. The recess 43 is coaxial with and complementary to the projection 42. The passage 18 within the working spool is extended to open into the end face of the frusto conical projection 42.

In use of the servo assembly shown in FIG. 6 as part of a motor vehicle clutch or braking system, the control rod 23 is coupled to the appropriate foot pedal as above mentioned while the communication port 45 is connected through a conduit of a fluid pressure operated device such as a brake or clutch master cylinder. With the assembly in its neutral condition as shown, the reaction chamber 19 communicates with the outlet port 3 by way of passage 20, recess 13 and port 11; in addition the piston chamber 8a communicates with the outlet port 3 (as does port 45 by way of port 44) through the extended passage 18 of the reaction chamber 19. Since the valvery is of the closed center type the fluid pressure port 12 is closed by the control spool 10.

When the control spool 10 is displaced axially rightwardly as a result of the foot pedal being operated, the recess 15 is closed to port 11 and reopened to communication with the fluid pressure at port 12. Fluid under pressure now flows from the inlet port 2 and by way of passage 20 to the reaction chamber 19 and assists in displacing the working spool 4 axially rightwardly as described with reference to FIG. 1. During such initial displacement of the working spool 4 its projection 42 moves into engagement with the complementary recess 43 which closes the end of passage 18. With passage 18 closed as aforementioned, continued movement of the working spool rightwardly causes the piston part 6 to displace fluid from the piston chamber 8a through the port 44 and also causes the secondary piston 39 to displace fluid through the communication port 45 to operate the clutch or brake device. During such displacement of fluid from the piston cylinder 7 it will be apparent that a reaction is imparted to the foot pedal through the control spool 10 by fluid pressure on its end face 16 in a similar manner to the above described embodiments.

When the foot pedal is released the control spool 10 is moved axially leftwardly relative to the working spool 4 by fluid pressure in the reaction chamber 19 while the secondary piston 39 is moved leftwardly under the action of spring 40 until it abuts the flange 41 as shown in FIG. 6. During such return movement of the secondary piston 39 the working spool 4 is returned substantially to its neutral condition and this spool 4 is finally lifted out of engagement with the secondary piston 39 to the positions shown by any pressure differential which may exist between the chamber 8a and the chamber 17 which latter is now open to communication with the exhaust port 3.

If required the piston part 6 can be slidably mounted on the cylindrical main body part of the working spool 4 and retained thereon, for example, by a clip 6a. In such an arrangement, if the working spool 4 is displaced axially rightwardly and the piston part 6 abuts the flange 41, the cylindrical main body part of the working spool can slide through the piston part 6. This provides an effective over-ride feature for movement of the working spool although there would be no power assistance once the piston part 6 abuts the flange 41.

The embodiment of the servo valve assembly which is incorporated in the system shown in FIG. 7 is of the open center type and is similar in many respects to that shown in FIG. 4 whereby the control spool 10 is in tandem with the working spool 4. The control spool 10 extends from the housing 1 and is coupled to a foot pedal 48 which may constitute, for example, the brake pedal of a vehicle in which the system is fitted. The housing 1 is conveniently provided with flanges 51 through which the servo valve assembly is bolted to the vehicle frame.

The working spool 4 has an axially extending passage 52 which opens at a mouth 30 in the end of the working spool adjacent to the control spool 10 while the other end of the working spool is provided with the piston part 6 which is slidable in the piston cylinder 7. The transmission rod 24 is secured by a pin 53 to the piston part 6 and extends through the piston cylinder 7 and from the servo valve assembly where it is coupled to operate the brake master cylinder (not shown) of the vehicle. The working spool 4 is conveniently made in two parts, a main tubular body part forming the passage 52 and the piston part 6 which is secured by a pin 54 to the tubular part for movement in unison therewith.

The passage 52 of the working spool is in constant communication with the fluid inlet port 2 by way of radially extending ports 55 in the tubular part of the working spool and a recess 56 into which the port 2 opens in the working cylinder 5. The end of the working spool 4 in which is located the mouth 30 is in constant communication with an annular recess 57 into which recess the fluid outlet port 3 opens in the working cylinder 5. The piston working chamber 8 formed between the piston part 6 and one end of the piston cylinder 7 is arranged to be in constant communication with the fluid inlet port 2, conveniently by way of a passage 58 which opens into the recess 56. The piston chamber 8a formed in the piston cylinder on the side of the piston part remote from the chamber 8 is in constant communication, by way of vent passage 7a, with the recess 57 and therethrough with the fluit outlet port 3.

The servo assembly as above described and shown in FIG. 4 is incorporated in a fluid pressure operated power assisted steering gear system of the vehicle which system comprises an hydraulic fluid reservoir 59 and a pump 60 which is continuously driven by the vehicle's engine to convey fluid under pressure from the reservoir to the fluid inlet port 2. The fluid outlet port 3 communicates with the fluid inlet of a conventional form of power assisted steering gear shown generally at 61 while the fluid outlet of such gear communicates with the reservoir 59. The arrangement and operation of the steering gear 61 is well known to persons skilled in the art of such devices and as such is not described herein.

With the servo valve assembly in FIG. 7 in its neutral condition as shown with the brakes of the vehicle inoperative, it will be apparent that fluid under pressure from the pump 60 can continuously circulate around the system by way of the open center valvery (port 2, recess 56, port 55, passage 52, recess 57 and port 3) in the assembly and that maximum fluid pressure will be available to provide steering assistance. On movement of the pedal 48 to apply the brakes, the control spool 10 is displaced axially rightwardly in the drawing through its cylinder 9 and relative to the working spool 4. During such displacement the end face 16 of the control spool abuts the adjacent end of the working spool and obturates the mouth 30. The effect of mouth 30 being closed is to cause a fluid pressure buildup in the passage 52, recess 56, passage 58 and piston chamber 8 (which may be considered as together constituting a reaction chamber). The working spool 4 will now move rightwardly under the assistance of such hydraulic pressure in the piston chamber 8 while a reaction in the opposite sense of axial direction is applied by hydraulic pressure in the passage 52 to the end face 16 of the control spool. Such reaction is fed back to the brake pedal 48 and provides a resistance to movement of the control spool 10 that is indicative of the power assistance which is being provided on the working spool 4 and is therefore a direct indication to the operator of the amount of braking effort which is being applied.

When the brake pedal 48 is released, fluid pressure in the passage 52 displaces the control spool 10 leftwardly relative to the working spool 4 to open the mouth 30 to communication with the outlet port 3 and the conventional biasing of the brake-master cylinder displaces the transmission rod 24 leftwardly to return the working spool to the neutral position as shown.

In FIG. 7 it will be noted that a restricted passage 62 is in permanent communication between the inlet and outlet ports 2 and 3. The purpose of this passage 62 is to ensure that, when the mouth 30 is closed by the end face 16 of the control spool, the steering gear 61 is not entirely starved of hydraulic fluid pressure from the pump 60 and therefore some power assistance for steering is available during application of the brakes. It will be apparent that when power assistance is being applied to the steering gear 61 while the brakes are inoperative, fluid pressure builds up in the system from the pump 60 and through the port 2, recess 56, passage 58, chamber 8, passage 52 and port 3 to the steering gear; such a pressure buildup could cause the working spool 4 to be displaced rightwardly in the drawing to apply the brakes. To prevent this possibility the piston chamber 8a and vent passage 7a are provided so that fluid pressure is substantially equalized on both sides of the piston part 6 for so long as the mouth 30 is open to communication with the vent passage 7a. The purpose of securing the transmission rod 24 by the pin 54 to the working spool is to ensure that if the piston chamber 8a is pressurized (together with the piston chamber 8 as aforementioned), then the transmission rod 24 cannot itself constitute a form of piston and move rightwardly in the drawing relative to the piston part 6 and thereby cause the brakes to be applied.

It required the servo valve assembly incorporated in the system of FIG. 7 can be replaced by the servo valve assembly of FIG. 4 provided that the transmission rod 24 in the FIG. 4 embodiment is secured by a pin or otherwise to the working spool of that embodiment (to ensure that the transmission rod cannot itself act in the form of piston as above mentioned).

Figure 8:
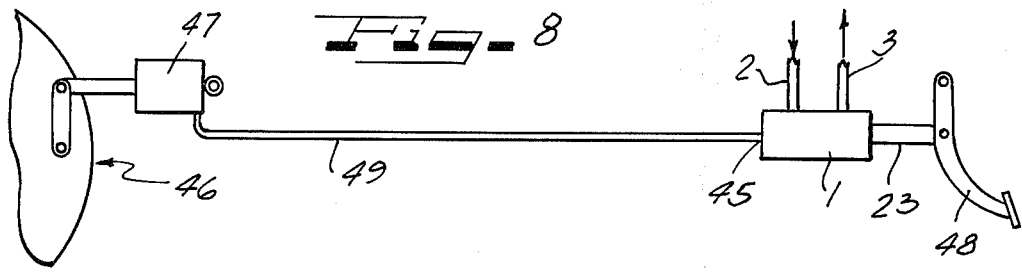

FIG. 8 illustrates a simple form of power booster system for a clutch or brake device shown generally at 46 having a fluid pressure operated master cylinder 47. The servo assembly shown in FIG. 8 is similar to that shown in FIG. 6 in which the hydraulic fluid displaced through communication port 45 on depression of the foot pedal 48 actuates the master cylinder 47 by way of conduit 49.

Figure 9:
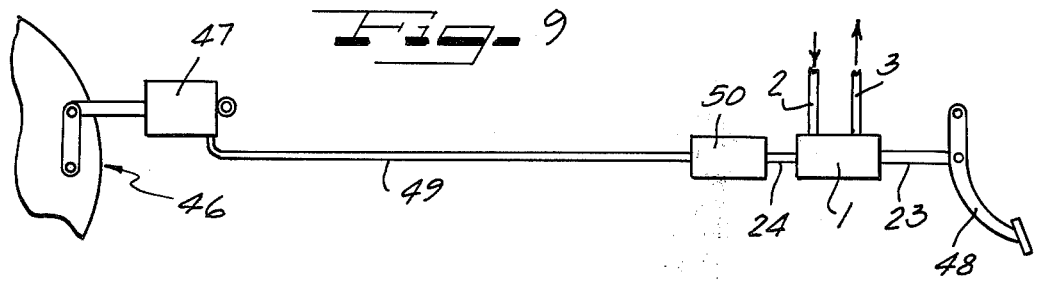

The power booster system shown in FIG. 9 incorporates a servo assembly similar to that shown in FIG. 1 in which axial displacement of the transmission rod 24 on depression of the foot pedal 48 operates a hydraulic ram 50 which in turn displaces fluid through conduit 49 to actuate the master cylinder 47.

Figure 10:
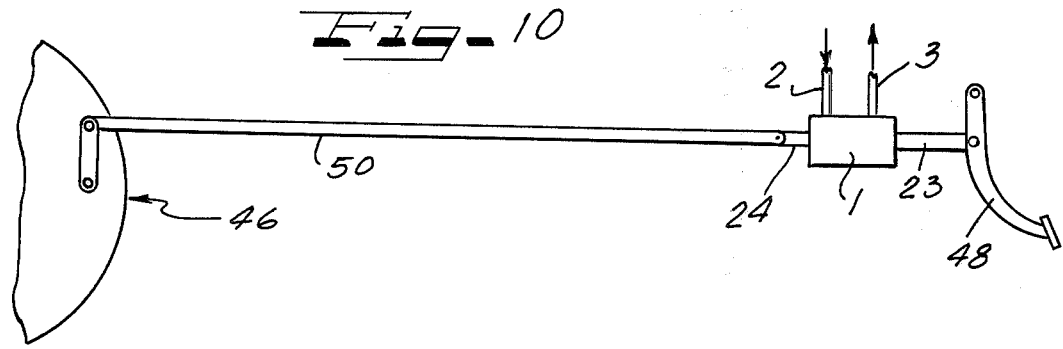

The power booster system shown in FIG. 10 incorporates a servo assembly similar to that shown in FIG. 1 in which the transmission rod 24 is connected by a mechanical linkage 50 to the device 46 so that on displacement of the rod 24 by depression of the foot pedal 48, the linkage 50 is displaced to operate the device 46 as appropriate.

In each of the servo assemblies as above described and illustrated a reaction is imparted to the operator which is proportional to the motive power transmitted from the output of the assembly and as such is indicative of both the force which the operator applies to the input of the assembly and the power assistance which is provided by the fluid pressure in the assembly. In addition, each of the servo assemblies is fail-safe. On displacement of the input, the output is substantially sympathetically displaced in the absence of fluid pressure so that if there should be a failure in pressure, the brake, clutch or other device can still be operated by manual force applied to the input of the assembly.

I claim as my invention:

1. A servo assembly for transmitting motive force from an input to an output thereof and which comprises, a valve housing having a fluid pressure inlet port and a fluid outlet port; a working spool in the housing and axially slidable in a working cylinder; a control spool in the housing and axially slidable in a control cylinder; a reaction chamber formed between the control spool and the working spool; the working spool having an effective pressure area in the reaction chamber which is greater than the effective pressure area of the control spool in the reaction chamber; axial movement of the control spool in the reaction chamber being responsive to the input and the output being responsive to axial movement of the working spool; means communicating the reaction chamber to the outlet port in a neutral condition of the assembly and in the absence of axial pressure on the control spool, and wherein the control spool is arranged in response to axial pressure thereon, to close off communication of the reaction chamber with the outlet port and to communicate the reaction chamber to the inlet port whereby fluid pressure in the reaction chamber provides power assistance for applying pressure to the working spool in one axial direction, and provides a reactive force on the control spool in the opposite axial direction.

2. The servo assembly as claimed in claim 1, wherein the control cylinder and working cylinder are coaxial.

3. The servo assembly as claimed in claim 1, wherein the output comprises a rod which extends from the assembly and is axially displaceable in said one sense by movement of the working spool.

4. The servo assembly as claimed in claim 1, wherein the working spool includes a piston part which is axially displaceable in a cylinder formed in said valve housing and forms therewith a piston working chamber and wherein said piston working chamber comprises part of the said reaction chamber so that when said reaction chamber is pressurized fluid pressure on the piston part tends to displace the working spool in said one sense of axial direction.

5. The servo assembly as claimed in claim 1, wherein the working spool and control spool are arranged in tandem.

6. The servo assembly as claimed in claim 1, and which incorporates valvery of the open center type, whereby in the neutral condition of the assembly the reaction chamber is open to communication with both the inlet and outlet ports.

7. The servo assembly as claimed in claim 1 and which incorporates valvery of the closed center type whereby, in the neutral condition of the assembly, the reaction chamber is closed to communication with the inlet port and is open to communication with the outlet port.

8. The servo assembly as claimed in claim 7, wherein said valvery is so arranged that on axial displacement of the control spool in said one sense from the neutral condition, the reaction chamber is closed to communication with the outlet port and progressively opened to communication with the inlet port.

9. A fluid pressure operated power booster system comprising, a servo assembly as claimed in claim 1 and in which the output communicates with a device which is intended to be operated by said output in response to a displacement of the working spool in said one sense of axial direction and the input is coupled to manual controlled means which is adjustable to effect displacement of the control spool.

10. A fluid pressure operated power booster system as claimed in claim 9, wherein said manual controlled means comprises a foot pedal.

11. A fluid pressure operated power booster system as claimed in claim 9, wherein the said device comprises the master cylinder of a vehicle hydraulic system for brake or clutch control.

12. A fluid pressure operated power booster system as claimed in claim 9 wherein said device comprises biasing means which reacts through said output to bias the working spool in said opposite sense of axial direction to the neutral condition of the servo assembly.

13. The combination of a fluid pressure operated power booster system as claimed in claim 9 and a vehicular fluid pressure operated power assisted steering gear system, in which the inlet and outlet ports of the servo assembly are connected in series with a fluid circuit for said steering gear system at a position downstream of fluid pressure developing means in said fluid circuit and upstream of power assistance control means for the steering gear in said fluid circuit; and wherein the arrangement is such that, with the servo assembly in its neutral condition, fluid flows from the pressure developing means by way of the inlet port, reaction chamber and outlet port to said power assistance control means and, on axial displacement of the control spool in said one sense from the neutral condition, fluid flow to the power assistance control means by way of the reaction chamber ceases.

14. The combination as claimed in claim 13, wherein the inlet port is in constant communication with the outlet port by way of a restricted passage.

15. The combination as claimed in claim 13 in which the piston part forms with the piston cylinder a first piston working chamber which comprises part of said reaction chamber and a second piston working chamber on the side of said piston part axially remote from said first chamber, and wherein said second piston working chamber is in constant communication by way of passage means with the outlet port.

16. The combination as claimed in claim 15 wherein the rod extends from the servo assembly through the second piston working chamber and is secured to the working spool.

17. The servo assembly as claimed in claim 1, wherein the output comprises fluid which is displaced from the assembly during axial movement in said one sense of the working spool.

18. The servo assembly as claimed in claim 14, wherein said fluid displacement is derived from the piston cylinder on the side of said piston part axially remote from said piston working chamber.

19. The servo assembly as claimed in claim 1, wherein biasing means is provided which biases the working spool in the opposite sense of axial direction to the neutral condition of the assembly.

20. The servo assembly as claimed in claim 19, wherein the biasing means comprises spring means housed within the assembly.

21. The servo assembly as claimed in claim 1 and which incorporates valvery of the closed center type and of the open center type and wherein said assembly has a primary fluid outlet and a secondary fluid outlet and said valvery is so arranged that, with the assembly in its neutral condition, the fluid inlet is closed to communication with said primary outlet and is open to communication with said secondary outlet while said reaction chamber is open to communication with said primary outlet, and on axial displacement of the control spool in said one sense from the neutral condition, the fluid inlet is progressively closed to communication with said secondary outlet and is progressively opened to communication with said reaction chamber and said reaction chamber is progressively closed to communication with said primary outlet.

22. The servo assembly as claimed in claim 21, wherein communication between the reaction chamber and said primary outlet is closed prior to communication being opened between the reaction chamber and the fluid inlet.

23. The servo assembly as claimed in claim 1, wherein the control cylinder is defined, at least in part, by a bore in the working spool so that the control spool is received, at least in part, within the working spool.

24. The servo assembly as claimed in claim 3, wherein the working spool is counterbored, the control spool is received within the counterbore and a first chamber comprising part of said reaction chamber is defined between an end face of the control spool and part of the length of said counterbore.

25. The servo assembly as claimed in claim 24, wherein said effective pressure area of said control spool is disposed within said first chamber and said effective pressure area of said working spool is disposed within a portion of said reaction chamber remote from said first chamber.

26. A servo assembly for transmitting motive force from an input to an output thereof and which comprises a valve housing having a fluid pressure inlet port and a fluid outlet port; a working spool in the housing and axially slidable in a working cylinder; a control spool in the housing and axially slidable in a control cylinder; the control and working cylinders being substantially in axial alignment and there being a reaction chamber located axially between, and at least partly defined by the control spool and the working spool; the working spool and control spools having different effective pressure areas in the reaction chamber which effective areas are such that, when the reaction chamber is pressurized, the applied axial pressure on the control spool is less than the applied axial pressure on the working spool; the output being responsive to axial displacement of the working spool in its cylinder and the input being capable of displacing the control spool in its cylinder in one sense of axial direction to contract the reaction chamber; and wherein the assembly is arranged so that, in a neutral condition of the assembly, the reaction chamber communicates with the outlet port and axial displacement of the control spool in said one sense by the input causes the working spool to be displaced in the said one sense and during said axial displacement of at least one of the spools, the reaction chamber is closed to communication with the outlet port and communicates with the inlet port whereby, when the inlet port is connected to a source of fluid under pressure, fluid pressure in the reaction chamber provides power assistance for displacing the working spool in the said one sense of axial direction and imparts to the control spool a reaction in the opposite sense, which reaction provides a resistance to movement of the control spool in said one sense which is proportional to and less than the motive force transmitted to the output.

* * * * *